(12) United States Patent
Cooper et al.

(10) Patent No.: US 7,845,445 B2
(45) Date of Patent: Dec. 7, 2010

(54) ELECTRIC POWERTRAIN SYSTEM WITH PLANETARY DRIVE

(75) Inventors: Lon Cooper, Royal Oak, MI (US); Wagner Yukio Hirao, Troy, MI (US); Mark C. Smith, Troy, MI (US); Adam Ritchie, Rochester Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 895 days.

(21) Appl. No.: 11/692,972

(22) Filed: Mar. 29, 2007

(65) Prior Publication Data

US 2008/0236908 A1 Oct. 2, 2008

(51) Int. Cl.
*B60K 1/00* (2006.01)
(52) U.S. Cl. ............... 180/65.51; 180/65.6; 475/337
(58) Field of Classification Search ............ 180/292, 180/65.1, 65.51, 65.6; 475/331, 334, 337; 310/83
See application file for complete search history.

(56) References Cited

U.S. PATENT DOCUMENTS

| | | | | |
|---|---|---|---|---|
| 2,258,328 A | * | 10/1941 | Lee et al. ............... | 180/253 |
| 2,301,497 A | * | 11/1942 | Alspaugh ............... | 475/337 |
| 3,376,761 A | * | 4/1968 | Stepputtis ............... | 475/346 |
| 3,452,612 A | * | 7/1969 | Casey ............... | 74/391 |
| 3,459,070 A | * | 8/1969 | Holdeman ............... | 475/337 |
| 3,598,188 A | * | 8/1971 | Foster ............... | 173/165 |
| 3,770,074 A | * | 11/1973 | Sherman ............... | 180/65.6 |
| 3,812,928 A | * | 5/1974 | Rockwell et al. ............... | 180/65.51 |
| 3,821,908 A | * | 7/1974 | Marsch et al. ............... | 475/159 |
| 3,897,843 A | * | 8/1975 | Hapeman et al. ............... | 180/65.51 |
| 3,906,818 A | * | 9/1975 | Benthake et al. ............... | 475/337 |
| 3,933,217 A | * | 1/1976 | Eichinger ............... | 180/370 |
| 4,183,266 A | * | 1/1980 | Osumi ............... | 475/337 |
| 4,186,626 A | * | 2/1980 | Chamberlain ............... | 475/337 |
| 4,237,750 A | * | 12/1980 | Takahashi ............... | 475/337 |
| 4,304,152 A | * | 12/1981 | Michling ............... | 475/330 |
| 4,330,045 A | * | 5/1982 | Myers ............... | 180/65.51 |
| 4,334,590 A | * | 6/1982 | Plumb ............... | 180/247 |

(Continued)

FOREIGN PATENT DOCUMENTS

DE 2109372 9/1972

(Continued)

OTHER PUBLICATIONS

European Search Report dated Jan. 5, 2010.

*Primary Examiner*—J. Allen Shriver, II
*Assistant Examiner*—Jacob Meyer
(74) *Attorney, Agent, or Firm*—Carlson, Gaskey & Olds, PC

(57) ABSTRACT

An electric drive unit for a vehicle wheel includes an electric motor that powers a planetary drive having a first stage gear set and a second stage gear set. Each of the first and second stage gear sets includes a sun gear that is driven by a motor output shaft. Each of the first and second stage gear sets also includes a plurality of planet gears that are in meshing engagement with a respective one of the sun gears. The first and second stage gear sets share a common ring gear. A planet carrier of the second stage gear set provides driving output to a wheel shaft that drives the vehicle wheel.

20 Claims, 1 Drawing Sheet

U.S. PATENT DOCUMENTS

| | | | | |
|---|---|---|---|---|
| 4,391,163 | A * | 7/1983 | Benthake et al. | 475/337 |
| 4,402,374 | A * | 9/1983 | Knur et al. | 180/65.7 |
| 4,693,425 | A * | 9/1987 | Meis et al. | 239/735 |
| 4,930,590 | A * | 6/1990 | Love et al. | 180/55 |
| 4,988,329 | A * | 1/1991 | Lammers | 475/337 |
| 5,014,800 | A * | 5/1991 | Kawamoto et al. | 180/65.51 |
| 5,127,485 | A * | 7/1992 | Wakuta et al. | 180/65.51 |
| 5,163,528 | A * | 11/1992 | Kawamoto et al. | 180/65.51 |
| 5,251,878 | A * | 10/1993 | Mann et al. | 254/344 |
| 5,272,938 | A * | 12/1993 | Hsu et al. | 74/594.1 |
| 5,382,854 | A * | 1/1995 | Kawamoto et al. | 310/67 R |
| 5,435,794 | A * | 7/1995 | Mori et al. | 475/343 |
| 5,472,059 | A * | 12/1995 | Schlosser et al. | 180/65.51 |
| 5,679,089 | A * | 10/1997 | Levedahl | 475/332 |
| 5,685,798 | A * | 11/1997 | Lutz et al. | 475/331 |
| 5,813,488 | A * | 9/1998 | Weiss | 180/65.6 |
| 5,845,732 | A * | 12/1998 | Taniguchi et al. | 180/65.6 |
| 6,328,123 | B1 * | 12/2001 | Niemann et al. | 180/65.51 |
| 6,386,553 | B2 * | 5/2002 | Zetterstrom | 280/5.51 |
| 6,440,030 | B1 * | 8/2002 | Minegishi et al. | 475/178 |
| 6,722,459 | B1 * | 4/2004 | Wendl et al. | 180/65.51 |
| 6,752,227 | B1 * | 6/2004 | Bachmann | 180/65.51 |
| 7,214,155 | B2 * | 5/2007 | Mueller et al. | 475/5 |
| 7,303,497 | B1 * | 12/2007 | Wige | 475/1 |
| 7,325,643 | B2 * | 2/2008 | Shimizu et al. | 180/346 |
| 7,350,605 | B2 * | 4/2008 | Mizutani et al. | 180/65.51 |
| 7,350,606 | B2 * | 4/2008 | Brill et al. | 180/65.51 |
| 7,410,017 | B2 * | 8/2008 | Gradu | 180/65.6 |
| 7,420,301 | B2 * | 9/2008 | Veny et al. | 310/75 C |
| 7,527,113 | B2 * | 5/2009 | Jenkins | 180/65.51 |
| 7,530,416 | B2 * | 5/2009 | Suzuki | 180/65.51 |
| 7,641,010 | B2 * | 1/2010 | Mizutani et al. | 180/65.51 |
| 2002/0023791 | A1 * | 2/2002 | Kima et al. | 180/65.5 |
| 2003/0010547 | A1 * | 1/2003 | Wachauer | 180/65.1 |
| 2004/0112656 | A1 * | 6/2004 | Bowen | 180/65.5 |
| 2005/0061565 | A1 * | 3/2005 | Mizutani et al. | 180/65.5 |
| 2005/0236198 | A1 * | 10/2005 | Jenkins | 180/65.5 |
| 2006/0144626 | A1 * | 7/2006 | Mizutani et al. | 180/65.5 |
| 2006/0219449 | A1 * | 10/2006 | Mizutani et al. | 180/65.5 |
| 2007/0181357 | A1 * | 8/2007 | Saito et al. | 180/65.5 |

FOREIGN PATENT DOCUMENTS

| | | |
|---|---|---|
| DE | 4206086 | 9/1993 |
| DE | 4206086 A1 * | 9/1993 |
| FR | 2437314 | 4/1980 |

* cited by examiner

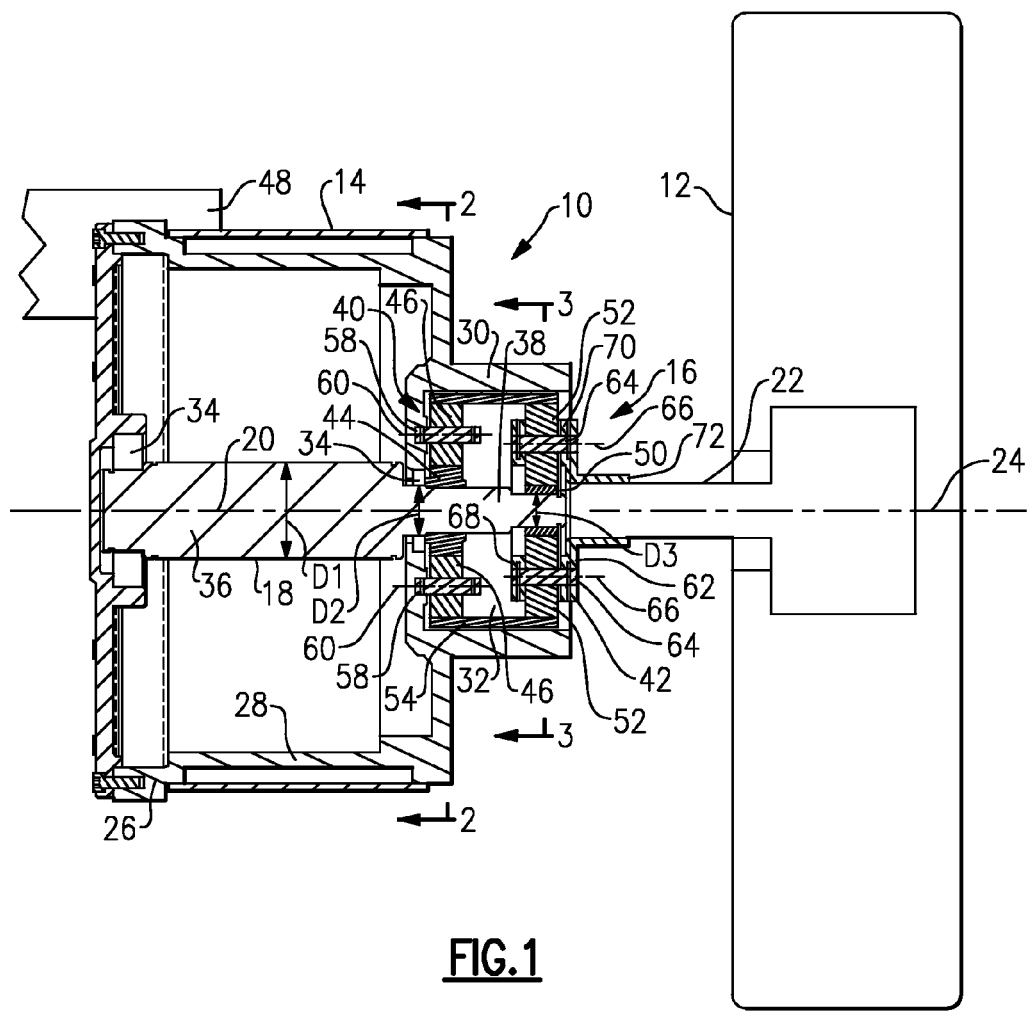
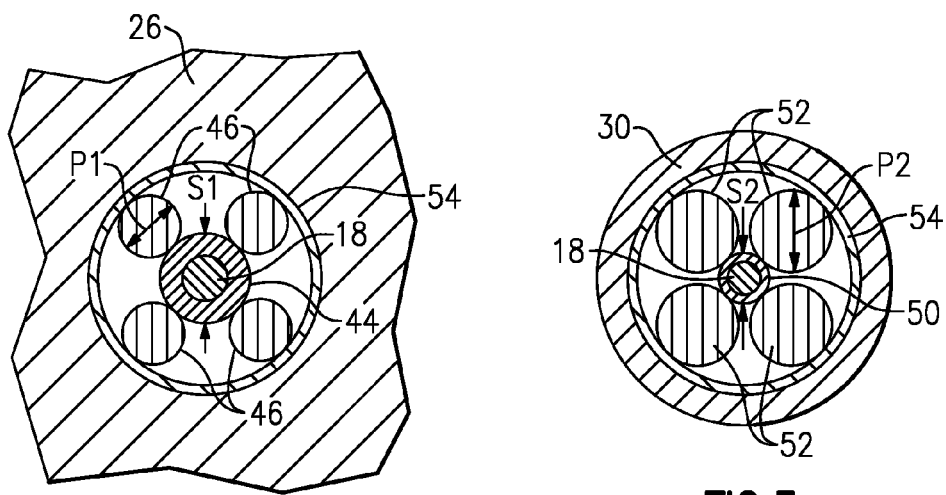

ELECTRIC POWERTRAIN SYSTEM WITH PLANETARY DRIVE

TECHNICAL FIELD

The subject invention relates to an electric drive unit for a vehicle wheel that utilizes an in-line, two-stage planetary drive to provide a radially and axially compact configuration.

BACKGROUND OF THE INVENTION

Electric drive vehicles utilize a combination of electric motors and gear sets to drive vehicle wheels. An electric motor and associated gear drive must provide a power dense package, i.e. a high gear reduction, which can fit within a limited space to drive a vehicle wheel. The required gear reduction is typically achieved by using multiple gear sets.

One disadvantage with using multiple gear sets is that significant areas of axial and radial packaging space are consumed by the gear sets to the expense of other wheel end components. For example, an electric motor and gear box configuration oriented at a right angle relative to the wheel shaft can adversely affect packaging of brake and suspension components.

Thus, there is a need for an electric powertrain configuration that provides both a radially and axially compact design, and which also provides a high gear reduction.

SUMMARY OF THE INVENTION

An electric drive unit for a vehicle wheel includes an electric motor having a motor output shaft coupled to a planetary gear drive. The planetary gear drive includes a first stage gear set and a second stage gear set that are both driven by the motor output shaft. The second stage gear set is coupled to a wheel shaft to drive the vehicle wheel.

In one example, the motor output shaft, the planetary gear drive, and the wheel shaft are coaxial to provide an axially and radially compact configuration. The first stage gear set includes a first sun gear and a first plurality of planet gears and the second stage gear set includes a second sun gear and a second plurality of planet gears. The first and second sun gears are both driven by the motor output shaft. A common ring gear is in meshing engagement with the first and second pluralities of planet gears.

In one disclosed configuration, each of the first plurality of planet gears is supported on a pin that is fixed to a non-rotating motor housing structure. The first sun gear rotates each associated planet gear about a respective individual axis, however, these planet gears do not rotate as a unit about the sun gear. These planet gears then rotate the common ring gear. The second stage gear set includes a planet carrier that supports the second plurality of planet gears via a pin connection. The planet carrier is a rotating component such that the planet gears of the second stage gear set rotate as a unit about the second sun gear. The planet carrier comprises a driving output that is coupled to the wheel shaft.

The planetary gear drive and the electric motor are axially aligned with a wheel axis, which results in a simplified packaging configuration with the additional benefit of being radially compact. Also, the planetary gear drive allows for a large reduction ratio in a very compressed axial design. The common ring gear, along with the possibility of using similar planet gears for the first and second stage gear sets allow for reduced manufacturing costs. Additionally, the gears could be easily varied to provide a wide range of gear reductions.

These and other features of the present invention can be best understood from the following specification and drawings, the following of which is a brief description.

BRIEF DESCRIPTION OF THE DRAWINGS

FIG. 1 shows a schematic cross-sectional view of an electric drive unit incorporating the subject invention.

FIG. 2 is a cross-sectional view of a first stage gear set as indicated in FIG. 1.

FIG. 3 is a cross-sectional view of a second stage gear set as indicated in FIG. 1.

DETAILED DESCRIPTION OF THE PREFERRED EMBODIMENT

An electric drive unit 10 for a vehicle wheel 12 is shown in FIG. 1. The electric drive unit 10 includes an electric motor 14 with a stator and rotor as known, and a planetary gear drive, shown generally at 16. The electric motor 14 includes a motor output shaft 18 that is rotatable about a motor axis 20. The planetary gear drive 16 is driven by the motor output shaft 18 and is coupled to drive a wheel shaft 22, which extends in a lateral direction across a vehicle width. The wheel shaft 22 rotates about a wheel axis 24 and is coupled to drive the vehicle wheel 12. In the example shown, motor axis 20 and the wheel axis 24 are co-axial, which provides an axially compact design.

The electric motor 14 includes a motor housing 26 that is mounted to a non-rotating structure 48. The non-rotating structure 48 could be a vehicle frame member, suspension component, or other vehicle structure, for example. The motor housing 26 includes a main portion 28 that encloses the rotor and stator and an extension portion 30 that extends outwardly from the main portion 28 toward the vehicle wheel 12. The extension portion 30 defines an inner cavity 32 that receives and substantially encloses the planetary gear drive 16.

The motor output shaft 18 is supported on bearings 34 that are mounted to the motor housing 26. The motor output shaft 18 includes a first portion 36 positioned within the main portion 28 of the motor housing 26 and a second portion 38 that extends into the extension portion 30. The first portion 36 is defined by a first diameter D1 and the second portion 38 is defined by a second diameter D2 that is less than the first diameter D1 in the example shown. It should be understood that D2 can also be larger than D1. The second portion 38, in this example, also includes a reduced diameter portion defined by a third diameter D3 that is less than the second diameter D2.

The planetary gear drive 16 includes a first stage gear set 40 and a second stage gear set 42 that cooperate to provide driving output to the wheel shaft 22. The first stage gear set 42 includes a first sun gear 44 mounted directly to the second portion 38 of the motor output shaft 18 at the second diameter D2, and a plurality of first planet gears 46 that are in direct meshing engagement with the first sun gear 44. In the disclosed embodiment there are four first planet gears 46 (see FIG. 2) to provide increased stability; however, the number of first planet gears 46 could be varied as needed.

The second stage gear set 42 includes a second sun gear 50 mounted directly to the second portion 38 of the motor output shaft 18 at the third diameter D3, and a plurality of second planet gears 52 that are in direct meshing engagement with the second sun gear 50. In the disclosed embodiment there are four second planet gears 52 (see FIG. 3) to provide increased stability; however, the number of second planet gears 52 could be varied as needed. The first planet gears 46 and the second planet gears 52 are both in direct meshing engagement with a common ring gear 54. In other words, the first 40 and second 42 stage gear sets share a single ring gear 54. The ring gear 54 is a floating ring gear that is rotated by the first 46 and second 52 planet gears about the motor axis 20 relative to the extension portion 30 of the motor housing 26. Thrust washers (not shown) may be utilized within the planetary gear drive 16 to assist with holding the floating ring gear 54 in a desired axial position.

The first planet gears 46 are each supported on a first planet pin 58. The first planet pins 58 are fixed to the motor housing 26, such that the first planet gears 46 each rotate about their own axis 60. Thus, the first planet gears 46 as a unit are held fixed relative to the first sun gear 44, i.e. the first planet gears 46 do not rotate as a unit about the first sun gear 44 but only rotate about their own respective axes 60. The motor output shaft 18 directly drives the first sun gear 44, which in turn rotates the first planet gears 46 about their axes 60. The first planet gears 46 rotate the ring gear 54.

The second stage gear set 42 includes a planet carrier 62 that rotates relative to the motor housing 26 about the motor axis 20. The second planet gears 52 are each supported on a second planet pin 64 that is mounted to the planet carrier 62. Thus, the planet gears 52 can each rotate about their own axis 66 in addition to being able to rotate as a unit about the second sun gear 50. The motor output shaft 18 directly drives the second sun gear 50, which in turn rotates the second planet gears 52 whose mesh with the ring gear 54 provide a net orbital planet rotation reduction that is output to the wheel shaft 22 through the planet carrier 62.

The planet carrier 62 includes first 68 and second 70 mounting portions that are positioned on opposing sides of the second planet gears 52. In other words, the second planet gears 52 are positioned axially between the first 68 and second 70 mounting portions. The planet carrier 62 also includes a collar portion 72 that extends outwardly from the second mounting portion 70. The collar portion 72 is coupled to the wheel shaft 22.

The motor output shaft 18, the first sun gear 44, the ring gear 54, the second sun gear 50, and the planet carrier 62 all rotate about the motor axis 20. The planet carrier 62 rotates the wheel shaft 22 about the wheel axis 24, which as described above is coaxial with the motor axis 20. This provides a very axially and radially compact electric drive unit because all of above-mentioned components are laterally in-line with the wheel shaft 22. This frees up packing space for other wheel end components such as brake and suspension components, for example.

FIG. 2 shows a cross-sectional view of the first stage gear set 40. The first sun gear 44 is defined by a first sun diameter SI and the first planet gears 46 are defined by a first planet diameter P1.

FIG. 3 shows a cross-sectional view of the second stage gear set 42. The second sun gear 50 is defined by a second sun diameter S2 and the second planet gears 52 are defined by a second planet diameter P2.

In the example shown, the first sun diameter S1 is greater than the second sun diameter S2 and the first planet diameter P1 is less than the second planet diameter P2. By varying the sizes of the sun and planet gears in the first 40 and second 42 stage gear sets, a desired gear reduction can be achieved at the output to the planet carrier 62. The example shown in FIGS. 1-3 is just one example, and it should be understood that the diameters of any of the sun and planet gears can be increased or decreased in various combinations as needed to provide a desired reduction.

The subject invention provides a fixed-differential star-planetary gear set that is integrated within an electric motor to provide an axially and radially compact electric drive unit for a vehicle wheel. The planetary gear drive and electric motor are in-line, i.e. axially aligned with each other, which allows for a very small radial package. Further, using a two-stage planetary configuration allows for large reduction ratios in a very compressed axial space. In the example configuration shown, the electric motor housing has a maximum diameter of nine inches or less, while still providing a significant gear reduction of at least 6:1.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. An electric drive unit for a vehicle wheel comprising:
   an electric motor having a motor output shaft rotatable about a motor axis;
   a planetary gear drive having a first stage gear set and a second stage gear set that are both driven by said motor output shaft, wherein said first stage gear set includes a first sun gear and a first plurality of planet gears in meshing engagement with said first sun gear and said second stage gear set includes a second sun gear and a second plurality of planet gears in meshing engagement with said second sun gear, said first and said second sun gears being directly driven by said motor output shaft, said second stage gear set to be coupled to a wheel shaft for driving the vehicle wheel, and wherein said planetary gear drive includes a single floating ring gear in meshing engagement with said first and said second stage gear sets; and
   wherein each first planet gear of said first plurality of planet gears is supported on a first planet pin that is fixed to a motor housing such that each of said first planet gears is rotatable about a respective first pin axis but said first planet gears are not rotatable as a unit about said first sun gear, and wherein said first planet gears rotate said single floating ring gear.

2. The electric drive unit according to claim 1 wherein the wheel shaft is to be rotatable about a wheel axis of rotation that extends in a lateral direction across a vehicle width and wherein said motor axis will be parallel to said wheel axis of rotation.

3. The electric drive unit according to claim 1 wherein said single floating ring gear is rotatable about said motor axis and wherein said first and said second pluralities of planet gears are in meshing engagement with said single ring gear.

4. The electric drive unit according to claim 3 wherein said motor housing has an extension portion with a recess that receives said single floating ring gear.

5. The electric drive unit according to claim 4 wherein said single floating ring gear, said motor output shaft, and said first and second sun gears are concentric and are positioned within said recess.

6. The electric drive unit according to claim 1 wherein said motor output shaft has a first portion defined by a first diameter and a second portion defined by a second diameter different than said first diameter, said first sun gear being fixed for rotation with said first portion and said second sun gear being fixed for rotation with said second portion.

7. The electric drive unit according to claim 6 wherein said first diameter is greater than said second diameter.

8. The electric drive unit according to claim 7 wherein each of said first plurality of planet gears is defined by a first planet gear diameter and each of said second plurality of planet gears is defined by a second planet gear diameter that is greater than said first planet gear diameter.

9. The electric drive unit according to claim 1 wherein each of said first and second pluralities of planet gears comprises four planet gears.

10. The electric drive unit according to claim 1 wherein said motor housing has an overall maximum diameter of nine inches or less.

11. The electric drive unit according to claim 10 wherein said first and said second stage gear sets cooperate to provide an overall reduction of at least 6:1.

12. The electric drive unit according to claim 1 wherein said single floating ring gear is rotated by said first and said second stage gear sets about said motor axis.

13. The electric drive unit according to claim 1 wherein said motor housing is adapted to be mounted to a non-rotating vehicle structure, said motor housing including a main portion enclosing a rotor and a stator and an extension portion fixed to said main portion that defines an inner cavity to substantially enclose said planetary gear drive.

14. The electric drive unit according to claim 1 wherein said second stage gear set includes a planet carrier that rotates about said motor axis, and wherein each second planet gear of said second plurality of planet gears is supported on a second planet pin that is mounted to said planet carrier such that each of said second planet gears is rotatable about a respective second pin axis and said second planet gears rotate as a unit about said second sun gear, and wherein said planet carrier is coupled to provide driving output to said planet carrier.

15. The electric drive unit according to claim 14 wherein said planet carrier includes first and second mounting portions wherein said first mounting portion is positioned on an inboard side of each of said second planet gears and said second mounting portion is positioned on an outboard side of each of said second planet gears, and wherein said planet carrier includes a collar portion extending outwardly from said second mounting portion that is coupled to the wheel shaft.

16. The electric drive unit according to claim 15 wherein said first sun gear, said single floating ring gear, said second sun gear, and said planet carrier all rotate about said motor axis.

17. An electric drive unit for a vehicle wheel comprising:
an electric motor having a motor output shaft rotatable about a motor axis, and wherein said electric motor includes a motor housing having an extension portion with a recess;
a planetary gear drive having a first stage gear set and a second stage gear set that are both driven by said motor output shaft, said second stage gear set to be coupled to a wheel shaft for driving the vehicle wheel, and wherein said first stage gear set includes a first sun gear and a first plurality of planet gears in meshing engagement with said first sun gear and said second stage gear set includes a second sun gear and a second plurality of planet gears in meshing engagement with said second sun gear, said first and said second sun gears being directly driven by said motor output shaft; and
a single ring gear received within said recess of said extension portion of said motor housing, wherein said first and said second pluralities of planet gears are in meshing engagement with said single ring gear, and wherein each of said first plurality of planet gears is supported on a pin that is fixed to said motor housing such that each of said first plurality of planet gears only rotates about a respective individual planet gear axis of rotation, said first sun gear rotating said first plurality of planet gears to rotate said single ring gear relative to said motor housing.

18. The electric drive unit according to claim 17 wherein said second stage gear set includes a planet carrier that is coupled to drive said wheel shaft for rotation about a wheel axis, and wherein each of said second plurality of planet gears is supported on a pin that is fixed to said planet carrier for rotation with said planet carrier about said wheel axis.

19. The electric drive unit according to claim 18 wherein said second sun gear, said second plurality of planet gears, said single ring gear, and said planet carrier all rotate about said wheel axis.

20. An electric drive unit for a vehicle wheel comprising:
an electric motor having a motor housing supportable by a non-rotating component and a motor output shaft that rotates about a motor axis;
a planetary gear drive having a first stage gear set and a second stage gear set that are both driven by said motor output shaft, said second stage gear set coupled to a wheel shaft for driving the vehicle wheel, said wheel shaft being coaxial with said motor output shaft;
said first stage gear set including a first sun gear directly driven by said motor output shaft, and a first plurality of planet gears in meshing engagement with said first sun gear, said first plurality of planet gears each being supported on a pin that is fixed to said motor housing;
said second stage gear set including a second sun gear directly driven by said motor output shaft, a second plurality of planet gears in meshing engagement with said second sun gear, and a planet carrier to be coupled to the wheel shaft wherein each of said second plurality of planet gears is supported on a pin that is fixed for rotation with said planet carrier about said motor axis; and
a single ring gear rotatable relative to said motor housing and surrounding said first and said second stage gear sets wherein both of said first and said second pluralities of planet gears are in meshing engagement with said single ring gear.

* * * * *